2,709,707

PROCESS FOR PREPARING VINYL SULFONAMIDE

Harold F. Park, East Longmeadow, Mass., assignor to Monsanto Chemical Company, St. Louis, Mo., a corporation of Delaware No Drawing. Application October 26, 1953, Serial No. 388,433

3 Claims. (Cl. 260—556)

This invention relates to a process for the preparation of vinyl sulfonamide. More particularly, this invention relates to a process for the preparation of vinyl sulfonamide from anhydrotaurine.

Vinyl sulfonamide has the structural formula

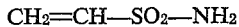

$$CH_2=CH-SO_2-NH_2$$

It is a water-soluble, alcohol soluble, normally solid material that usually decomposes when heated to temperatures above 200° C. Vinyl sulfonamide contains both a reactive vinyl group and a reactive amino group and, as a result, special problems are encountered in its preparation.

Anhydrotaurine has the same empirical formula as vinyl sulfonamide but has the structural formula

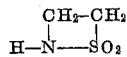

It can be prepared by reacting ammonia with 1,2-ethane disulfonyl chloride under anhydrous conditions. Thus, Kohler (American Chemical Journal, vol. 12, page 744, 1897) discloses the reaction of ammonia with 1,2-ethane disulfonyl chloride under anhydrous conditions, the product being anhydrotaurine, a water-soluble, alcohol-insoluble crystalline material melting at a temperature of 88° C. Clutterbuck and Cohen have reported the reaction of dry ammonia with disulfonyl chloride in solution in dry ether, the product being a water-soluble, alcohol insoluble crystalline material melting at 87° C. (Journal of the Chemical Society, vol. 121, page 125, 1922). The authors felt that the product might be vinyl sulfonamide but the material which they obtained corresponds to the anhydrotaurine of Kohler.

From this it is seen that anhydrotaurine can be prepared with comparative ease. However, there is no known use for anhydrotaurine and, as a result, it has remained a laboratory curiosity. It would be desirable to convert anhydrotaurine to vinyl sulfonamide. However, prior to the present invention, there has been no known method by which this could be accomplished.

Accordingly, an object of the present invention is the provision of a process for the preparation of vinyl sulfonamide.

Another object is the provision of a process for the preparation of vinyl sulfonamide from anhydrotaurine.

These and other objects are attained by rapidly heating anhydrotaurine to a temperature of from 300° to 500° C. and at an absolute pressure of 100 mm. of mercury or less, to form vaporous vinyl sulfonamide and substantially instantaneously with its evolution, condensing the vinyl sulfonamide to prevent its decomposition.

The following examples are given in illustration and are not intended as limitations on the scope of this invention. Where parts are mentioned, they are parts by weight.

EXAMPLE I

*Preparation of anhydrotaurine*

Prepare a solution of 100 parts of 1,2-ethane disulfonyl chloride in 1,000 parts of anhydrous diethyl ether. Slowly bubble about 10 parts of anhydrous ammonia through the thus-prepared solution over a two hour period while maintaining the solution at a temperature of about 10° C. A white precipitate is formed as a result of this reaction. Filter the reaction mixture, add 1,000 parts of anhydrous ethanol to the residue, and agitate for a period of about 15 minutes. Filter the mixture and dilute the residue with a suspension of 25 parts of silver carbonate in 100 parts of water. Agitate and filter. Evaporate the filtrate until only a small volume of liquid remains and then add about 4 volumes of absolute ethanol. An oily extract will settle. Pour off the supernatent layer of ethyl alcohol, dilute the oily residue with glacial acetic acid and slowly evaporate the acetic acid in a closed vessel containing potassium hydroxide. The residue is anhydrotaurine, a crystalline material melting at 87° C. It is soluble in water but insoluble in alcohol. When a sample is subjected to analysis in an infra-red spectrophotometer, the spectra indicate the presence of an amine group but do not indicate the presence of a vinyl group. This is the method described by Clutterbuck and Cohen.

EXAMPLE II

*Preparation of vinyl sulfonamide*

Connect the outlet end of a first condenser with the inlet end of a second condenser. Place the first condenser in close proximity to a suitable flask containing 100 parts of the anhydrotaurine of Example I. Connect the inlet end of the first condenser to the flask and connect the outlet end of the second condenser to a suitable vacuum pump. Adjust the temperature of the first condenser to about 5° C. with a suitable coolant such as ice water and adjust the temperature of the second condenser to a temperature of about —75° C. with a suitable coolant such as Dry Ice. Reduce the pressure in the system to about 2 mm. of mercury with a vacuum pump and then, as rapidly as possible, heat the flask to a temperature of about 400° C. The anhydrotaurine in the flask is decomposed, forming a tarry residue and volatile decomposition products consisting essentially of vinyl sulfonamide and hydrogen sulfide. The vaporous decomposition products are drawn into the condensers substantially instantaneously with their evolution. The vaporous vinyl sulfonamide is solidified in substantially pure form in the first condenser and the remainder of the volatile constituents, including the hydrogen sulfide, are solidified in the second condenser thus preventing contamination of the vacuum pump.

The vinyl sulfonamide prepared from anhydrotaurine in this fashion is a water-soluble, alcohol-soluble material. When a sample is subjected to analysis in an infrared spectrophotometer, the spectra indicate the presence of both a vinyl group and an amine group. The vinyl sulfonamide does not have a sharp melting point. The temperature at which it softens to a flowable condition is dependent on the rate at which it is heated. If it is heated slowly, it softens at a temperature of about 170° C. and if careful heating is continued, it will polymerize to a solid condition at about 180° C. If the vinyl sulfonamide is heated rapidly, it will soften to a flowable condition at a temperature of about 120° C.

Vinyl sulfonamide is prepared in accordance with the present invention by rapidly heating anhydrotaurine to a temperature of from 300° to 500° C. at an absolute pressure of less than about 100 mm. of mercury and substantially instantaneously removing and solidifying the evolved vinyl sulfonamide to prevent decomposition of the same. It is preferable to use a temperature of from about 350° to 450° C. and an absolute pressure of less than about 10 mm. of mercury to obtain the best yield of vinyl sulfonamide. In Example II vinyl sulfonamide was prepared from substantially pure anhydrotaurine. However, vinyl sulfonamide can be prepared from impure anhydrotaurine if desired. Also, it is not absolutely necessary to use two separate condensers and only one condenser can be used if desired. However, it is preferable to provide suitable means such as a condenser, a column of particulate lead acetate, etc. for separately absorbing or otherwise recovering the hydrogen sulfide, thus eliminating a contamination problem. The temperature at which the condenser for the vinyl sulfonamide is maintained is not critical. However, it is preferable that the condenser be at room temperature or less in order to insure the substantially instantaneous solidification of the vinyl sulfonamide.

Vinyl sulfonamide can be used to prepare polymers and copolymers that are suitable for a wide variety of purposes such as the preparation of synthetic fibers, molding powders, soil additives, adhesives, coatings, etc.

What is claimed is:

1. A process for preparing vinyl sulfonamide which comprises rapidly heating anhydrotaurine to a temperature of from 300° C. to 500° C. at an absolute pressure of less than about 100 mm. of mercury in order to form vaporous vinyl sulfonamide-containing decomposition products and, substantially simultaneously with their evolution, cooling the vaporous decomposition products to a temperature not substantially greater than room temperature in order to solidify the vinyl sulfonamide.

2. A process as in claim 1 wherein the anhydrotaurine is heated to a temperature of from 350° to 450° C. at a pressure of less than about 50 mm. of mercury.

3. A process as in claim 1 wherein the anhydrotaurine is heated to a temperature of about 400° C. at a pressure of about 2 mm. of mercury.

References Cited in the file of this patent

Kohler: Am. Chem. J., vol. 19, pp. 744–5 (1897).

Autentrieth et al.: Ber. Deut. Chem., vol. 34, p. 3469 (1901).

Autentrieth et al.: Ber. Deut. Chem., vol. 36, p. 3626 (1903).

Clutterbuck et al.: J. Chem. Soc., vol. 121, pp. 120–8 (1922).